United States Patent [19]

Guidicelli

[11] Patent Number: 4,793,205

[45] Date of Patent: Dec. 27, 1988

[54] SELF-ADJUSTING MECHANICAL CABLE-CONTROL APPARATUS

[75] Inventor: Charles Guidicelli, Noyen, France

[73] Assignee: Acco Cable Controls Ltd., Worcestershire, England

[21] Appl. No.: 18,537

[22] Filed: Feb. 25, 1987

[30] Foreign Application Priority Data

Feb. 26, 1986 [FR] France .................. 86 02650

[51] Int. Cl.$^4$ .............................................. F16C 1/10
[52] U.S. Cl. ................................. 74/501.5 R; 74/560
[58] Field of Search ................. 74/501.5 R, 512, 502, 74/501 R, 501 A, 501 D, 560; 188/24.19, 2 D; 192/111 A

[56] References Cited

U.S. PATENT DOCUMENTS

| 2,009,206 | 7/1935 | Rosner | 74/501 R |
|---|---|---|---|
| 3,988,945 | 11/1976 | Fasano | 74/512 |
| 4,263,998 | 4/1981 | Moriya | 74/501 R |
| 4,304,322 | 12/1981 | Beccaris | 192/111 A |
| 4,420,988 | 12/1983 | Deligny | 192/111 A X |
| 4,464,950 | 8/1984 | Deligny | 74/501.5 R |
| 4,464,951 | 8/1984 | Courbot | 192/111 A X |
| 4,580,455 | 4/1986 | Beugelsdyk et al. | 74/501 R X |

FOREIGN PATENT DOCUMENTS 3506769 9/1985 Fed. Rep. of Germany ........ 74/512
56-44930 4/1981 Japan .
2176861 1/1987 United Kingdom ........... 192/111 A Primary Examiner—Gary L. Smith
Assistant Examiner—Rodney M. Lindsey
Attorney, Agent, or Firm—Solon B. Kemon

[57] ABSTRACT

A self-adjusting mechanical cable-control apparatus 6 (FIG. 1) has one end 14 of the cable 1 connected to a pedal 3 by a slotted yoke 17 having a transverse coupling member 22 extending through a U-shaped aperture 21 in the pedal. A tubular spacer 23 of rigid thermoplastics extends co-axially of the cable 1 and co-operates with the yoke 17 and a fixed wall 8 to limit movement of the cable 1 toward a member 4 to be actuated by the influence of resilient biasing spring structure associated with the member 4, thereby defining a rest position unaffected by accidental excessive return displacement of the pedal. A saddle 26 of plastics material having a low co-efficient of friction lines the U-shaped aperture 21 and is connected to the yoke 17 by a spring 33 biasing the pedal 3 toward the yoke 17 and a pedal stop 13. The tubular spacer 33 is dimensioned such that, in the rest position, the transverse coupling member 22 is spaced from the bearing surface of the saddle 26 by a gap e thereby permitting independent setting of the limit positions of the pedal 3 and the member 4 to be actuated.

10 Claims, 1 Drawing Sheet

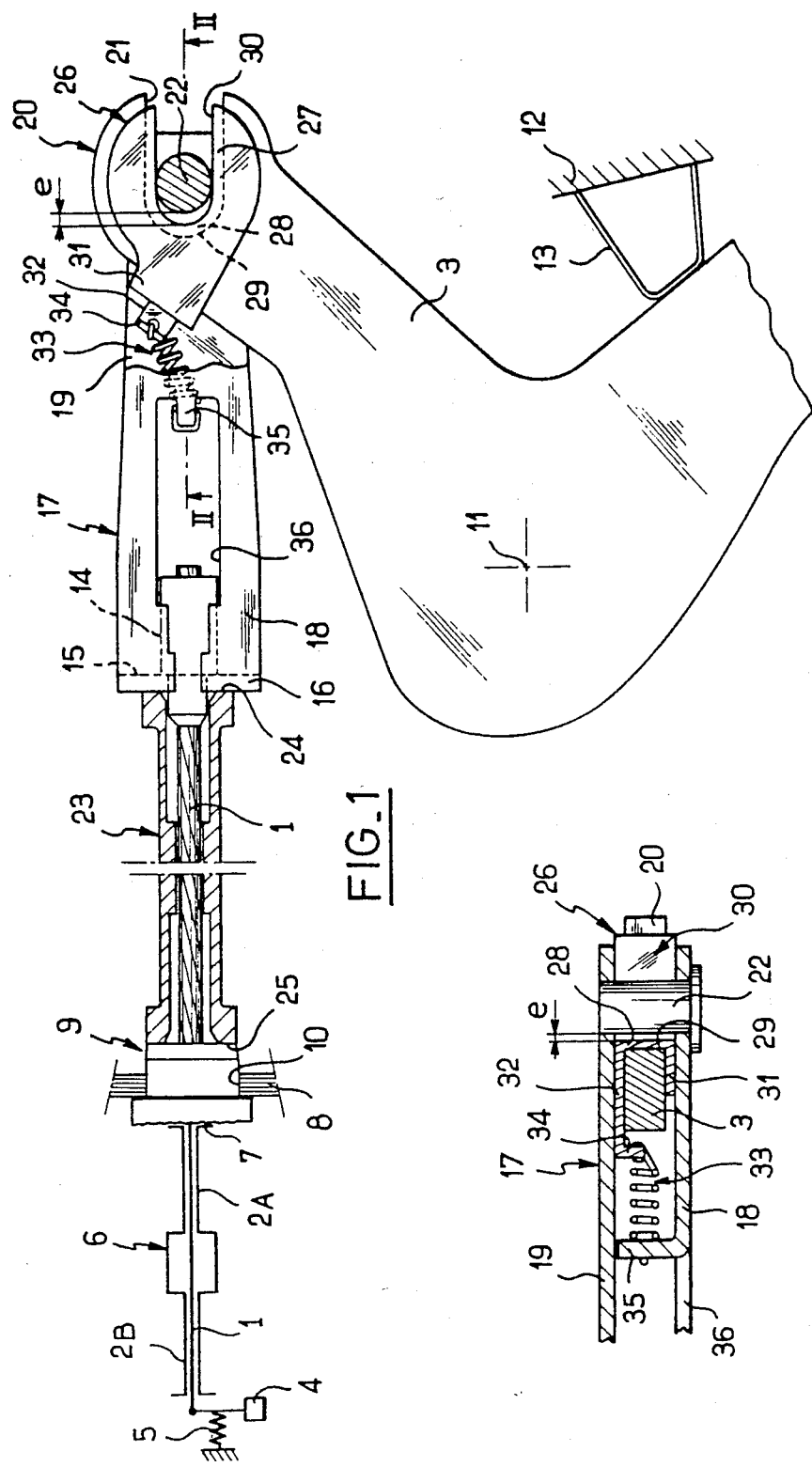

SELF-ADJUSTING MECHANICAL CABLE-CONTROL APPARATUS

The present invention relates to self-adjusting mechanical cable-control apparatus, particularly apparatus for operating the clutch of a motor vehicle, including a length of cable sliding inside a flexible cable sheath and having a first end connected to a clutch pedal and a second end connected to the clutch mechanism provided with a return spring, the pedal being biased in a direction towards a pedal stop, the cable sheath having a first end anchored in a relatively stationary wall adjacent the pedal and a self-adjusting mechanism being incorporated in the cable run.

A self-adjusting mechanical cable-control apparatus of this type is described in U.S. Pat. No. 4,464,950.

In practice, the actuating pedal is pivotably mounted on a metal bracket carrying a pedal stop positioned on the stationary wall to which the first end of the cable sheath is anchored, such as a firewall separating the driver's compartment of the vehicle from the engine compartment. In order to reduce weight and costs, the pedal support bracket is a relatively light sheet-metal structure which does not have a high degree of rigidity. Consequently, when the actuating pedal is suddenly released, for example when the driver's foot slips from the pedal after the latter has been depressed, the sudden return movement of this pedal towards its rest position gives rise to elastic deformation of the support bracket, the pedal and the stop. This causes the pedal temporarily to go beyond the original rest position, thereby momentarily resulting in slackening of the cable which the automatic adjustment device, being particularly sensitive and precise by nature, automatically and immediately corrects. This has the consequence that, when the pedal returns toward the original rest position, due to the correction performed previously, the automatic adjustment device remains in a locked position and thereby prevents the pedal from fully returning to the original rest position. This restricts the amount of travel available for subsequent actuation of the clutch and if not adjusted will lead to failure.

According to the present invention, the connecting means includes a transverse member extending through a U-shaped aperture in the pedal and a spacer member is positioned intermediate the connecting means and the walls to limit movement of the connecting means toward the wall.

The invention will now be described by way of example with reference to the accompanying, partly diagrammatic, drawings in which:

FIG. 1 is a partly broken away and partly sectioned elevation of a self-adjusting cable control apparatus and a portion of a mechanical actuator therefor, and FIG. 2 is a cross-sectional view of a portion taken on line II—II of FIG. 1.

FIG. 1 shows a mechanical cable-control apparatus for a motor-vehicle clutch, including a length of cable 1 sliding inside a cable sheath 2 and having a first end connected to an actuating pedal 3 and a second end connected to a clutch 4 provided with spring return means 5. The cable sheath 2 is divided into two axially separated sheath sections $2_A$ and $2_B$ interconnected by an automatic adjustment device 6, such as that described in the abovementioned U.S. Pat. No. 4,464,950, which device is capable of selectively interlocking the two sheath sections $2_A$ and $2_B$ by means of an actuating member moved in synchronism with displacement of the cable 1 and consisting, for example, of a friction member co-operating with the latter. The sheath section $2_A$ has a first end 7 anchored in a stationary wall 8 by means of a sheath ferrule 9 which is mounted in an opening 10 of the stationary wall 8 and beyond which the first end of the cable 1 extends to connect with a yoke 17 on the pedal 3. The pedal 3 is pivotably mounted, about a pin 11, on a support plate 12 (part only of which is shown) located on the stationary wall 8 and which also supports a pedal stop 13 defining a rest position for the clutch pedal.

A sleeve 14 is crimped onto the first end of the cable 1, and has a shoulder normally bearing against the rear or internal face 15 of an end plate 16 of the yoke 17. Two parallel side flanges 18 and 19 extend from the end plate 16 on either side of an actuating end 20 of the pedal 3. The actuating end 20 of the pedal 3 is formed with a U-shaped aperture 21 which is open towards the face remote from the yoke 17 and carries a saddle 26 inside which there extends a cylindrical transverse member 22 connecting the free ends of the flanges 18 and 19 of the yoke 17.

A tubular spacer member 23, for example, of a rigid thermoplastic material such as a polyacetal is positioned around the exposed cable end 1 between the end sleeve 14 and the sheath ferrule 9, and is dimensioned so that, in the rest position of the clutch 4, it bears, by means of the opposed ends 24 and 25 respectively, against the end plate 16 of the yoke 17 and against the ferrule 9 thus precisely positioning the sleeve 14 of the cable 1 in the rest position of the mechanical cable-control apparatus, the coupling arrangement of the yoke 17 with the actuating end 20 of the pedal 3 allowing the latter to move slightly, in the anti-clockwise direction in FIG. 1, beyond the rest position normally defined by the pedal stop 13.

The saddle 26, which is of a plastics material possessing good sliding properties with respect to metals, for example polyamide, has a hub 27 with a U-shaped slot 30 which is open towards the rear and is in register with the U-shaped aperture 21 of the pedal. A partly cylindrical portion 28 of the hub 27 seats on the part cylindrical portion 29 of the U-shaped aperture 21 and this slot 30 defines two opposite parallel guiding surfaces between which the transverse member 22 of the yoke 17 is accommodated. The saddle 26 is also formed with two lateral flanges 31 and 32 interposed between the flanges 18 and 19 of the yoke 17 and the adjacent lateral faces of the actuating end 20 of the pedal 3. A spring 33 extends between an inwardly bent lug 34 on the flange 32 of the saddle 26 and an inwardly bent lug 35 on the flange 18 of the yoke 17. A slot 36 is formed in the flange 18 in alignment with the lug 35 and is dimensioned to permit insertion of the sleeve 14 in the yoke 17. The yoke 17 and spacer member 23 are dimensioned such that in the rest position shown in FIG. 1, in which the yoke 17 bears on the spacer member 23, which in turn bears against the ferrule 9 in the stationary wall 8, and the pedal 3 bears against its pedal stop 13, there is normally a slight gap e between the transverse member 22 and the part cylindrical portion 28 of the U-shaped slot 30 of the saddle 26. The saddle 26 is biassed into contact with the part cylindrical portion 29 of the U-shaped aperture 21 of the pedal by the spring 33, thereby ensuring that the pedal 3 bears against the stop 13 independently of the relative rest positions of the pedal 3 and of the yoke 17, the gap e introducing a small amount of lost motion during the initial stages of movement of the pedal 3 away from the stop 13 before the part cylindrical portion 28 of the hub 27 engages the transverse member 22 and thus the yoke 17 and the cable 1 to actuate the clutch 4.

In operation, should the pedal 3 suddenly be released from a depressed position (that is, rotated away from the stop 13) to return to the rest position by the effect of the spring return means 5 acting through the cable 1, the mechanical cable-control apparatus returns to the normal rest position and the yoke 17 is positioned precisely on its allocated rest position by the tubular spacer member 23. However, on account of the compressibility of the pedal stop 13 the pedal 3 rotates slightly beyond the normal rest position, thereby resulting momentarily in an increase in the gap e between the transverse member 22, which is precisely positioned on the yoke 17, and the portion 28 of the saddle 26 seated in U-shaped aperture 21 of the pedal, after which the latter resumes, owing to the resilience of the support 12 and stop 13, substantially the original rest position. Since the excess movement is accommodated in the U-shaped aperture 21, and movement of the yoke 17 is limited by the tubular spacer 23, no reduction in tension, or slackness, arises in the cable 1 as a result of the sudden release of the pedal 3.

Although the present invention has been described with reference to a particular embodiment, it is not limited thereto, but may be subject to variations and modifications considered necessary by a person skilled in the art. Thus, the tubular spacer member 23 may be replaced by a part, made of metal for example, fixed to the yoke 17 or formed as a single piece with a flange of the yoke or secured to the stationary wall 8 co-operating with a stop member on the cable 1. Similarly, the return spring 33 may be arranged directly between the pedal and the yoke 17 which may be in any other form, for example a flexible spiral enclosing a bottom plate such as 16.

I claim:

1. Self-adjusting mechanical cable-control apparatus including a length of cable sliding inside a cable sheath and arranged to have a first end connected through connecting means to an actuating pedal and a second end arranged to be connected to a member to be actuated provided with a resiliently biased return means, the cable sheath having a first end anchored in a wall fixed relative to the cable adjacent the pedal, with the connecting means including a transverse member extending through a U-shaped aperture in the pedal, and positioned intermediate the connecting means and the wall, a spacer member so dimensioned that with the connecting means bearing against the spacer member, and the pedal bearing against a pedal stop, the transverse member is disengaged from a bearing surface of the U-shaped aperture of the pedal.

2. Control apparatus as claimed in claim 1 wherein resilient means extending between the connecting means the the pedal resiliently bias the pedal about a pivot pin toward the connecting means and toward the pedal stop.

3. Control apparatus as claimed in claim 1, wherein the U-shaped aperture of the pedal is lined with a saddle.

4. Control apparatus as claimed in claim 3, wherein the connecting means includes a yoke having two lateral flanges extending to either side of the pedal supporting the transverse member and the saddle is formed with two lateral flanges extending intermediate the pedal and the respective adjacent flanges of the yoke.

5. Control apparatus as claimed in claim 4, wherein the saddle is of plastics material having a low coefficient of friction with respect to metal.

6. Control apparatus as claimed in claim 4, wherein one of the lateral flanges of the connecting means is formed with a slot dimensioned to permit insertion of an end fitting of the cable and a shoulder is formed internally of the connecting means as a seating for the end fitting.

7. Control apparatus as claimed in claim 1, wherein the spacer member is tubular and extends co-axially of the cable with a first end bearing against the connecting means and a second end arranged to be located on the fixed wall.

8. Control apparatus as claimed in claim 7, wherein the second end of the tubular spacer member bears against a sheath stop member mounted in an opening of the fixed wall.

9. Control apparatus as claimed in claim 8, wherein the tubular spacer member is made of rigid thermoplatics material.

10. Control apparatus as claimed in claim 4, wherein resilient means extend between a lug on one of the lateral flanges of the connecting means and a lug on one of the lateral flanges of the saddle and serve resiliently to bias the pedal about a pivot pin toward the connecting means and toward the pedal stop.

* * * * *